United States Patent
Hennig et al.

(10) Patent No.: US 6,587,827 B1
(45) Date of Patent: Jul. 1, 2003

(54) ORDER FULFILLMENT PROCESSING SYSTEM

(75) Inventors: Carole Hennig, Auburn, CA (US); Melody Peters, Auburn, CA (US); Carolyn M. Nickey, Auburn, CA (US); Gary Brandt, Roseville, CA (US); Eric Price, Roseville, CA (US); Marjorie Sladek, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/425,378

(22) Filed: Oct. 22, 1999

(51) Int. Cl.[7] ............................................. G06F 17/60
(52) U.S. Cl. ............................ 705/1; 705/26; 705/27; 705/28
(58) Field of Search ................................. 705/1, 26–28

(56) References Cited

U.S. PATENT DOCUMENTS

| | | | | |
|---|---|---|---|---|
| 5,038,283 A | * | 8/1991 | Caveney | 364/403 |
| 5,758,322 A | * | 5/1998 | Rongley | 704/275 |
| 5,758,328 A | | 5/1998 | Giovannoli | 705/26 |
| 5,884,309 A | | 3/1999 | Vanechanos, Jr. | 707/10 |
| 6,236,972 B1 | * | 5/2001 | Shkedy | 705/1 |
| 6,249,772 B1 | * | 6/2001 | Walker et al. | 705/26 |
| 6,263,317 B1 | * | 7/2001 | Sharp et al. | 705/26 |
| 6,324,522 B2 | * | 11/2001 | Peterson et al. | 705/28 |
| 6,336,135 B1 | * | 1/2002 | Niblett et al. | 709/215 |

FOREIGN PATENT DOCUMENTS

| | | | |
|---|---|---|---|
| EP | 0 820 203 A2 | 7/1997 | H04Q/3/00 |
| GB | 2 265 032 | 9/1993 | G06F/15/24 |

OTHER PUBLICATIONS www.webopedia.com (6 pages).*
Microsoft Computer Dictionary fourth Edition, p. 167 (end user).*

* cited by examiner

*Primary Examiner*—James P. Trammell
*Assistant Examiner*—Jalatee Worjloh

(57) ABSTRACT

A method and system for processing a customer generated order for a product, more particularly to a method for one or more client computers connected through a server to a plurality of supplier computers to fulfill a customer generated order. The method includes the client creating an order event with a preferred supplier, the server routing the order event to the preferred supplier, the server monitoring status of the order event from the preferred supplier, the preferred supplier processing the order event, and the server periodically synchronizing inventory between the client and all suppliers.

23 Claims, 6 Drawing Sheets

ORDER FULFILLMENT PROCESSING SYSTEM

The present invention generally relates to a method and a system for processing customer generated orders for any one of a plurality of products. More particularly, the invention relates to a method and system having one or more client computers connected via a large scale network to a server and a plurality of supplier computers for virtually automatically processing customer generated orders through all necessary steps from receipt of the customer order to delivery and billing of the purchased product.

Most known conventional customer order fulfillment processes generally include complex internal distribution systems, warehouse processes, procurement processes, customer order placement processes and may or may not include the capability of forecasting inventory levels. Most of these processes are done manually in that they are at least partially done with the use of considerable human intervention, which is inefficient, costly and time consuming. Some of these processes may take several days from the receipt of a customer order to the time of shipping.

There are computer implemented systems that attempt to reduce the use of human intervention at various steps of such complicated manual fulfillment processes. However, they have not been completely successful because their architecture and methodology are deficient, and require manual intervention at some point during the process. For example, some known computer implemented systems that are currently in use in processing orders in large volume require human intervention in initially accepting the order and placing it in the system. However, human intervention is also needed to place a purchase order with a supplier to fulfill the customer order. Additionally, human intervention may be required to receive the ordered product from the supplier, place it in a warehouse, and then ship it to the customer. At every point in the process where human intervention is required, additional inefficiency, expense and time delay are introduced.

Accordingly, it is a primary object of the present invention to provide an improved method and system for automatically and efficiently processing customer generated orders for products upon entry of the orders into the system to delivery of the ordered product.

A related object of the present invention is to provide such an improved method and system that has an architecture and methodology that enables customer orders to be processed in a manner that effectively bypasses the use of conventional distribution systems, warehouse processes, procurement processes and the need for forecasting of inventory levels.

Another object of the present invention is to provide an improved method and system to create a fully automated end-to-end supply chain or customer order fulfillment process that can operate on a worldwide scale using a large scale network, such as the Internet.

Yet another object of the present invention is to provide such an improved method and system that is designed to receive customer orders, determine the suppliers that will deliver the products ordered, process the orders by immediately shipping the products and billing the customer, and periodically synchronize the available inventory of all suppliers, all without human intervention.

Still another object of the present invention is to provide such an improved method and system for use by large scale multinational companies as well as small enterprises, wherein the advantages of the system include: (i) substantially reducing the number of people that are required for processing customer orders through delivery of a product and billing for the same, (ii) substantially increasing the speed of processing of such customer orders through delivery and billing for the same, and (iii) substantially reducing the overhead costs associated with such processing. The system is extremely powerful in that it can operate on a worldwide basis and can accommodate literally thousands of products ordered by thousands of customers supplied by thousands of suppliers.

BRIEF SUMMARY OF THE INVENTION

The present invention is directed to a method and a system for processing customer generated orders for any number of products that may be marketed by a large multinational company or a small one. The method and system process the customer order from its receipt through delivery of and billing for the products.

More particularly, the method and system are adapted to utilize one or more client computers connected via a large scale network such as the Internet to a server and to a plurality of supplier computers to fulfill customer generated orders on a worldwide basis. The client computers and supplier computers, depending on the volume of activity, may be personal computers, mini computers, mainframe computers and other types of computers, and will be referred to respectively herein as a client and a supplier.

In accordance with the present invention, after the customer order for one or more products is received by the client from a customer, the client creates an order event with a preferred supplier, which the server routes to the preferred supplier. The server then periodically monitors the supplier to determine the status of the order event as it is processed by the preferred supplier. If the supplier accepts the purchase event, it ships the product and notifies the client of that action, and the client then prepares a bill for the customer. The server periodically synchronizes inventory levels between the client and all suppliers, including obviously the preferred supplier.

The present invention is adapted to communicate over a large scale network, which is preferably the Internet, on a frequent basis with all clients and all suppliers that are a part of the system. This preferably includes one client, although more than one client and hundreds of suppliers are contemplated. The structure of the information that is required to make the system function is well defined and does not permit spontaneous communications that have not been previously defined. Communications are chosen from a multiplicity of choices to convey the desired information, and care has been given to defining requests and responses to every common and some uncommon exigencies that may arise in the course of processing such customer orders, determining preferred suppliers, making shipments, determining available inventory, and billing customers for products ordered. The careful structuring of information that must be communicated in the course of doing business enables the processing to be carried out automatically, without any human intervention except in but a few instances.

Such processing for a typical order can be completed in a few seconds, which when projected for a large segment of a company's sales activity, will produce tremendous reductions in overhead and operating expenses.

DETAILED DESCRIPTION OF THE INVENTION

Broadly stated, the present invention is directed to a method and a system for automatically processing customer generated orders without any human intervention for a multitude of particular products that are being marketed. The client creates an order event with a preferred supplier for the customer generated order, and routes the order event to the preferred supplier. In addition, the server frequently monitors the status of the order event from the preferred supplier as the supplier processes the order event. Lastly, the server periodically synchronizes the inventory between the client and all suppliers.

Figure 1:
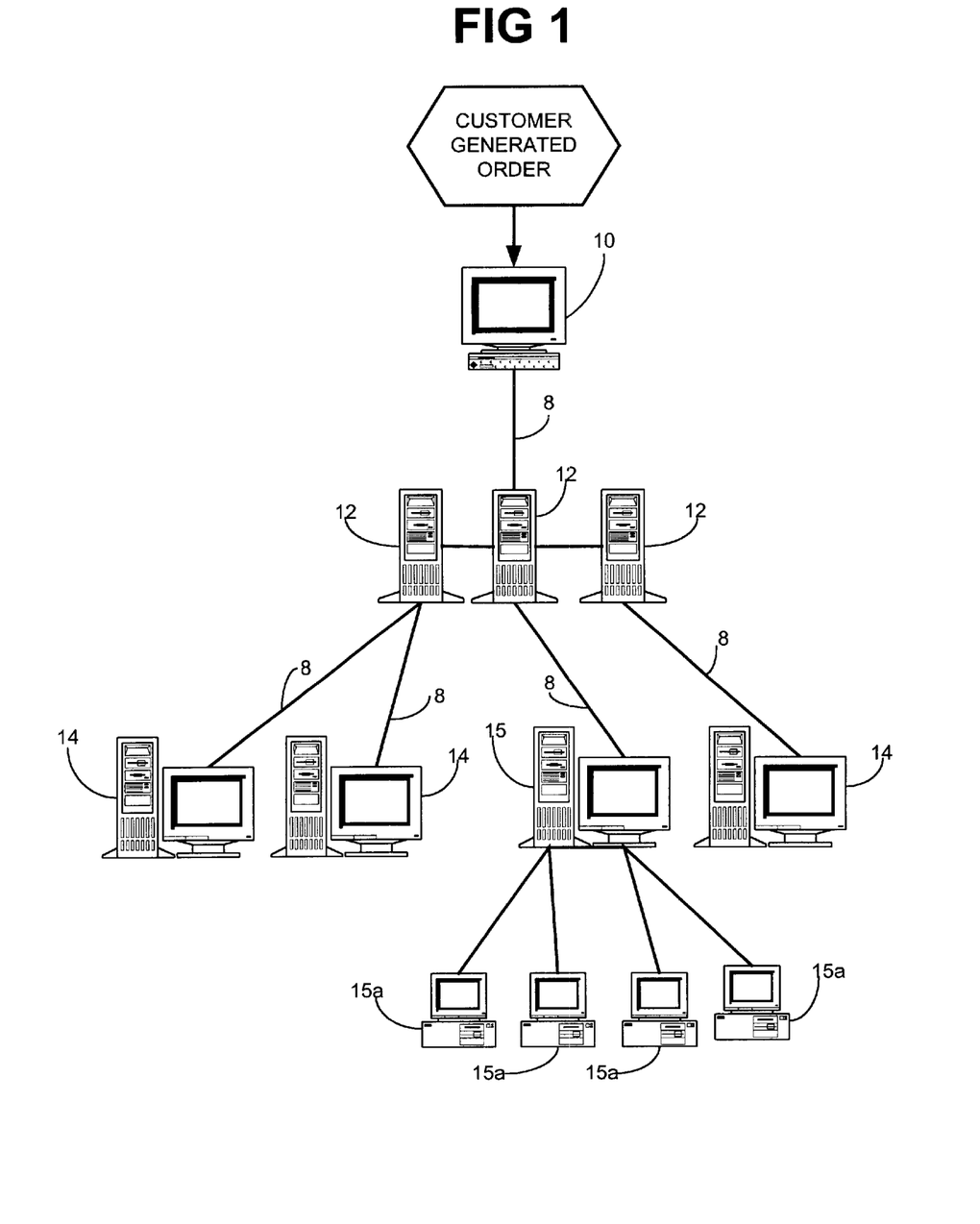
FIG. 1 is a schematic diagram of a network system in which the present method is implemented.

Turning now to FIG. 1, the system in which the present method is implemented is generally indicated as part of a preferably wide area network 8. A client computer (client) 10 is connected to a network server (server) 12 via the network 8, and the server 12 also communicates with a plurality of supplier computers (suppliers) 14 and a supplier hub 15 through the network 8. The client 10, suppliers 14, and the supplier hub 15 can be personal computers, mini computers, mainframe computers, or other types of computers depending on the volume of activity that is being carried out. Customers can order various products, which can be goods and/or services, that are marketed by the company that is using the system, by communicating with the client to order the products. Customer orders can be made by telephone, in person, via the Internet or by other means, the only requirement being that it has to be entered in the system at the client.

The supplier hub 15 is shown being connected to a number of non-subscribing supplying entities 15a that may be supply products that are maintained in the hub inventory. Such supplying entities may be competitors of the company using the system and therefore are not connected in the same manner as the suppliers 14. In this regard, the system of the present invention communicates with the supplier hub 15 in the same manner as subscribing suppliers 14, but the supplying entities have only limited access to information that is supplied to the supplying hub 15 itself In other words, the hub blocks certain sensitive and/or proprietary information from being accessed by the supplying entities. Although the extent of the filtering of information may vary, it is preferred that the supplying entities not have access to such information such as the identity and location of customers, pricing information or the installed base of any products. The information that the supplying entity can access is the current inventory of the product that it is supplying to the hub and the shipment activity. There may also be feedback to the supplying entity via telephone or email or the like about inventory or other problems. It is preferred to have an established maximum and minimum limits of inventory present in the hub, and flags or other alerts can be triggered when the product inventory is not within the limits.

Next, it should be understood that the network 8 is preferably the Internet because it is accessible by customers and suppliers that may literally be located anywhere in the world. Such accessibility from almost any location in the world is a very desirable aspect of using the Internet and is important to the scale of utilization of the present invention. However, other types of networks can certainly be used in conjunction with the Internet or even in place of it. For example, the network connection may comprise a virtual Internet host, a dialup connection or a router, which enables the client 10 and supplier 14 to exchange information through the server 12.

Given that the preferred embodiment is the use of the internet as the communication connection, the present invention is currently implemented with a Business-To-Business Integration Server from webMethods, Inc. (webMethods B2B web server), which can be found at webmethods.com. However, it should be understood that another similar web server product that provides a mapping of HyperText Markup Language (HTML) to a programming language may be used and is within the scope of the present invention. The mapping function of the webMethods B2B web server is the primary feature that the present invention is using, which maps the HTML codes to a custom Java class members of variables. This is the current protocol for communication between the client 10 and supplier 14. But since Extensible Markup Language (XML) is the preferred protocol for the present invention, the webMethods B2B will play less of a role as the XML becomes more prevalent in the network.

Because the network system needed for the implementation of the present invention varies greatly in complexity and size, an explanation of the current preferred embodiment of the network topology is given for clarification purposes. The system shown in FIG. 1 has a single client but may have several client component computers connected to each other. In that event, each client component may have a distinct function. For example, one client component may deal only with warehouse accounting. Another client component may be used for finance. Each client component becomes a single layer of the network, and all the multiple layers work together to define the system. In such a system, one client component should serve as a message broker layer or component. The message broker client component may provide data transformation, data formatting, business rules implementation, network configuration, and message gateways.

Figure 2:
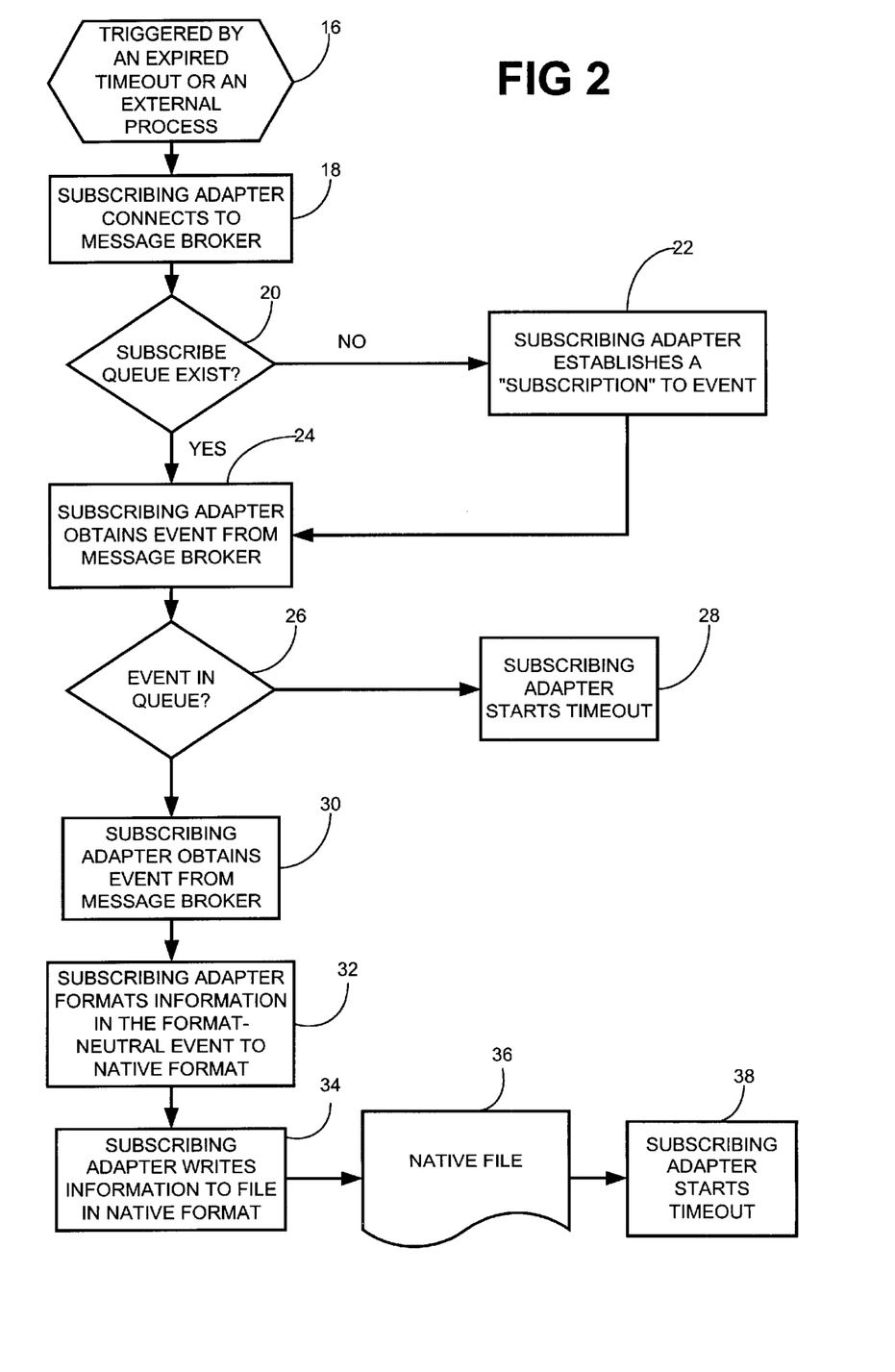
FIG. 2 is a flowchart illustrating a generic file adapter to the message broker client.

In the event that several client component computers are used, there may be a need to adapt or interface data and information from one client component to another, and an adapter for doing so is illustrated in FIG. 2. This figure shows the logical flow of a generic file adapter allowing other client components to create a native file format for the message broker client component (message broker). The adapter can comprise software that is resident in any of the client components.

Currently, the preferred embodiment of the present invention uses ActiveWorks 3.0 from Active Software, Inc. as its message broker client component, and Active Software, Inc. can be found at activesw.com. Again, it should be understood that another similar messaging product that supports a standard messaging functionality may be used and is within the scope of the present invention. Taking advantage of the ActiveWorks' functionality of the data transformation and formatting, the client components connected to the ActiveWorks in the present invention are adapted to translate data into one native file format to enable communications between the different client components.

Referring to FIG. 2, an expired timeout or an external process triggers the subscribing adapter (block 16), the subscribing adapter connects to the message broker (block 18). The adapter looks for a subscribe queue in the client (block 20). If the subscribe queue does not exist, the subscribing adapter establishes a "subscription" to event (block 22). The term "subscription" refers to the client component setting itself up as a subscriber of the message broker. Once the subscribe queue is found (block 20), the subscribing adapter tries to obtain the events from the message broker (block 24) if available (block 26). But if no event is found in the queue, the subscribing adapter starts a timeout to trigger itself again later (block 28).

The duration of timeouts is preferably configurable depending upon what operation is being carried out and which supplier is involved. A timeout associated with an inventory-synchronization event or a status check event may be quite short for a supplier that supplies thousands of products in a short time. In that event, the timeout may be as short as one minute or less. Lesser volume suppliers may have a timeout duration of approximately 15 minutes, for example. Suppliers that only infrequently supply products may have a timeout duration of several hours. The important consideration is that the timeout be of sufficiently small duration to ensure that adequate information relating to the operation of the system is communicated among the client, the server and the individual suppliers to assure reliable operation.

Once the event or events are found, the subscriber adapter picks up the events (block 30), and formats the information to a native format (block 34) creating a native file (block 36) which can be read by all subscriber client components to the message broker. In this way, the message broker enables all client components to share data and information on the network. Furthermore, the type of events that the client component looks for depends greatly on what type of client component it is. For example, a purchase order maintenance client component may get only order events. Similarly, a network order router manager client component may get order events, confirmation events, and rejection events. The subscribing adapter ends with setting the timeout to restart the subroutine (block 38).

Figure 3:
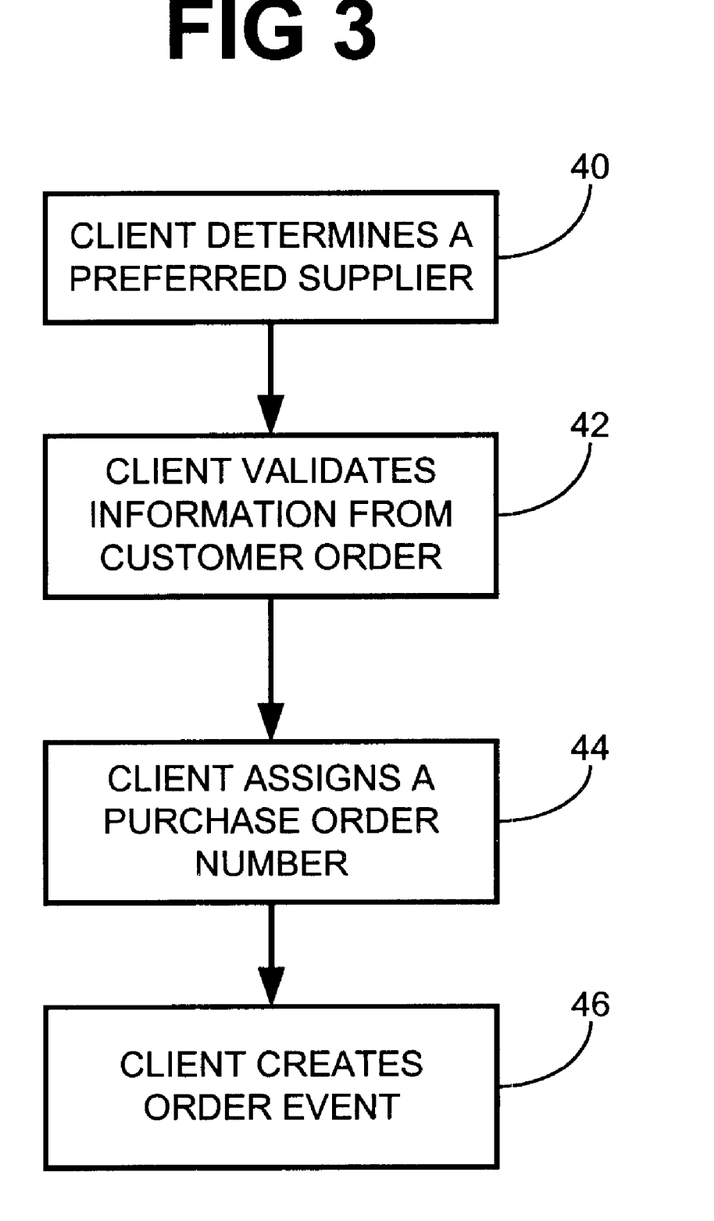
FIG. 3 is a flowchart illustrating the subroutine of the client creating an order event with a preferred supplier.

In accordance with an important aspect of the present invention, the manner in which the client 10 creates an order event with a preferred supplier 14 is shown in FIG. 3. For each customer order received, the client 10 determines a preferred supplier 14 for the product ordered (block 40). In the preferred embodiment, a preferred supplier 14 is determined to be a supplier with available inventory of the product and preferably located in the same geographical area as the shipping destination specified by the customer order, (which should minimize the time and/or cost of shipping) but other considerations may be used to determine preferred status. For example, transportation efficiencies may dictate the choice of a particular supplier as a preferred supplier even though that supplier is geographically farther away from the shipping destination than another supplier.

It should also be appreciated that a customer order may be for a large amount of product that may not be available at one supplier, or may specify several different shipping destinations that may not be convenient to a single supplier. In either event, there may be more than one preferred supplier determined to accommodate the availability constraints or the shipping destinations requested.

After the preferred supplier 14 is determined, the client 10 next validates the information from the customer order by checking the validity of such information as the vendor number and/or the part number (block 42). The client 10 then assigns a unique purchase order number (block 44), and creates an order event with all the information from the customer order and the assigned purchase order number (block 46). The preferred format and information contained in the order event are shown in the attached Appendix A, Table 1.

Figure 4:
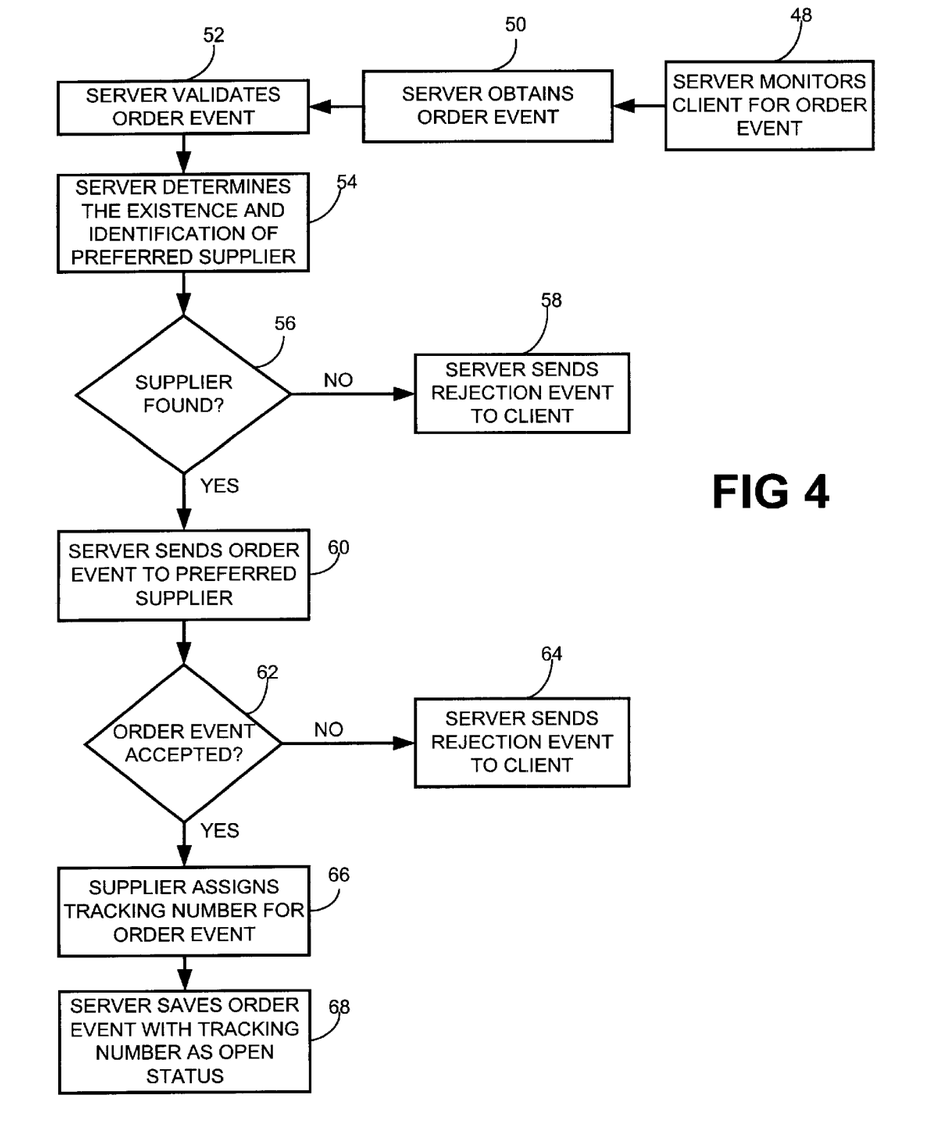
FIG. 4 is a flowchart illustrating the subroutine of the server routing the order event to the preferred supplier.

In accordance with another aspect of the present invention, FIG. 4 shows the steps for the subroutine which defines how the server 12 routes an order event to the preferred supplier 14. The server 12 first monitors the client 10 for an order event (block 48). There are various ways to implement this step, but one way is the use of persistent connection to the client 10 for incoming order events. The server 12 obtains the order event from the client 10 if there is an order event available (block 50). The server 12 next validates the order event (block 52), for example, by checking to see if there is any empty field and/or incorrect types of data used in the field.

From the order event, the server 12 determines the identification of the preferred supplier 14 (block 54) and verifies that this preferred supplier 14 actually exists (block 56). If the supplier 14 is not found, the server 12 sends a rejection event to the client 10 (block 58). The preferred format and information contained in the rejection event is shown in the attached Appendix A, Table 3.

On the other hand, the server 12 directs the order event to the preferred supplier 14 if there is a supplier 14 (block 60). The supplier 14 may then reject or accept the order instantly (block 62). The product is immediately shipped directly from the supplier to the customer if the supplier 14 accepts the order. In the context of the present invention, immediate shipping means shipping on the same day that the order is placed. The server 12 sends a rejection event to the client 10 if the supplier 14 rejects the order event (block 64). If the supplier 14 accepts the order event from the server 12, the supplier 14 assigns a tracking number to the order event (block 66). The server 12 then saves the order event with the tracking number as an open status (block 68).

Figure 5:
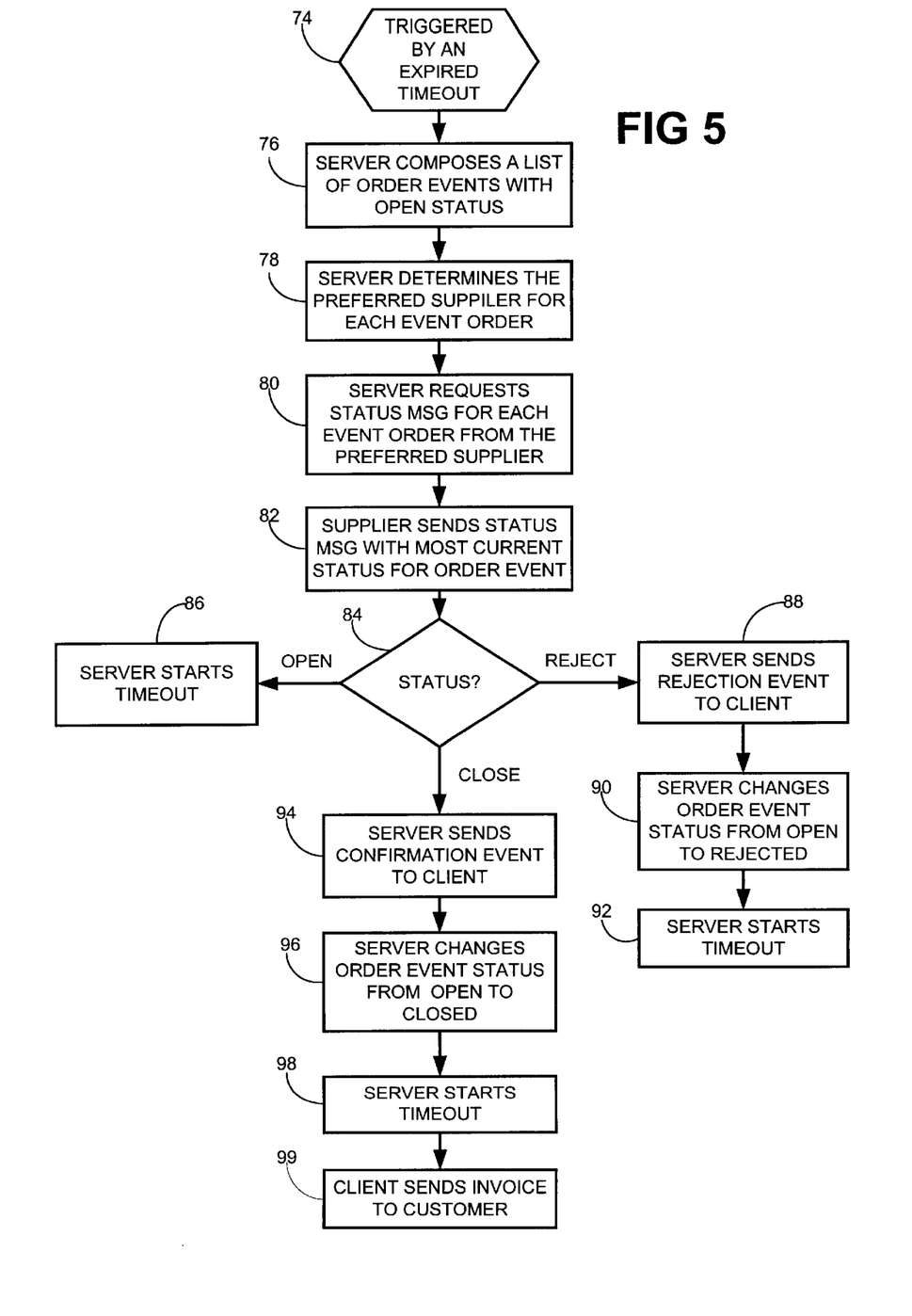
FIG. 5 is a flowchart illustrating the subroutine of the server monitoring status of the order event from the preferred supplier.

Next, the subroutine of the server 12 monitoring status of the order event is shown in FIG. 5. The server 12, which is triggered by an expired timeout (block 74), composes a list of all the order events with open status located in its database (block 76). From each order event in the list, the server 12 identifies the preferred supplier 14 listed in the order event (block 78) and requests a status message from that preferred supplier 14 (block 80). The supplier 14 sends a status message with the most current information for the order event (block 82). For example, the status message may indicate whether the order event is open, closed, or rejected (block 84). If the order event is open, the server 12 starts a timeout to restart this monitoring status subroutine again (block 86).

For an order event with a rejected status, the server 12 sends a rejection event to the client 10 (block 88). The server 12 then changes the order event's status from open to rejected (block 90) and starts a timeout to restart this subroutine (block 92). On the other hand, the server 12 sends a confirmation event to the client 10 (block 94) if the order event has been closed by the supplier 14. The server 12 again changes the status of the order event, but this time from open to closed (block 96), and starts the timeout (block 98). After receiving the confirmation event indicating that the order has been closed, the client sends an invoice to the customer (block 99). The preferred format and information contained in the confirmation event are shown in the attached Appendix A, Table 2.

Figure 6:
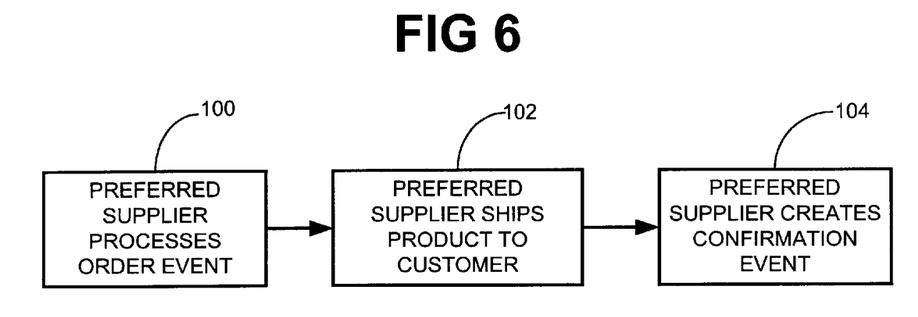
FIG. 6 is a flowchart illustrating the subroutine of the preferred supplier processing the order event; and, FIG. 7 is a flowchart illustrating the subroutine of the server synchronizing inventory between the client that routed the order event and the preferred supplier.

The subroutine of how the preferred supplier 14 processes the order event is shown in FIG. 6. The preferred supplier 14 prepares the order event for processing (block 100). The preparation may include things such as printing shipping labels, preparing the packaging, or making the shipping receipt. After the preferred supplier 14 ships the product to the customer (block 102), it creates a confirmation event (block 104).

Figure 7:
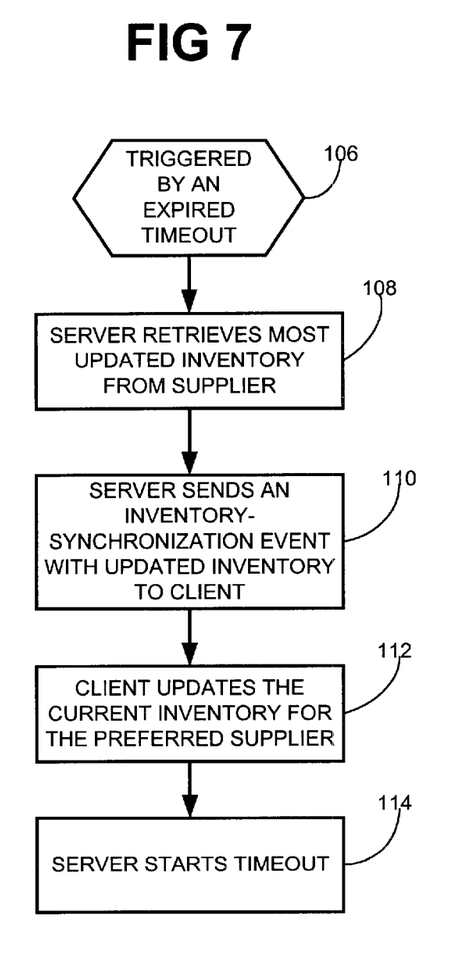

In accordance with another important aspect of the present invention, the server synchronizes the inventory between the client and all suppliers as shown in FIG. 7. This subroutine is triggered by an expired timeout (block 106), and the timeout is set at the end of the subroutine to restart again. The server 12 first retrieves the most updated inventory level from all suppliers, including the preferred supplier 14 by making a connection to all suppliers 14 (block 108). Then, the server 12 sends an inventory-synchronization event with the updated inventory to the client 10 (block 110). The client 10 updates the current inventory for all suppliers, including the preferred supplier, in its own database (block 112), in which the information is later used for picking a preferred supplier 14 for a given order event. The server ends the subroutine by starting the timeout (block 114). The preferred format and information contained in the inventory-synchronization event are shown in the attached Appendix A, Table 4.

From the foregoing description, it should be understood that an improved method and system for processing a customer generated order for a product have been shown and described, which have many desirable attributes and advantages. The method and system allow a customer order to be routed directly to the supplier for order fulfillment and delivery, creating a fully automated customer order fulfillment process. Because of the superior design of the system, the entire processing of a customer order can be completed, billed and shipped, and the determination of the process is made within only a few seconds without any human intervention.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

APPENDIX A

Entries in the Size column indicate the character type and number of characters in the field. For example:

X6 indicates an alpha-numeric entry containing 6 characters. Left justify and format with trailing blanks.

9(2) indicates a numeric entry containing 2 characters. Right justify and format with leading zeros. For example, 1 is entered as 01.

9(7)v99 indicates a numeric entry up to 7 characters long, with an implied decimal and two decimal places; thus, the entry 199 is interpreted as 1.99.

TABLE 1

Order Event
The following table describes the details of the order event.

| No | Interface Element | Size | Special Instructions |
|---|---|---|---|
| 1 | TRANSACTION ID | X6 | Literal = "SHPREQ" |
| 2 | DISTRIBUTION CENTER | X8 | VS supplier's vendor code. |
| 3 | ORDER TYPE | X2 | If it begins with "I", the order is internal to HP. If it begins with "T", the order is for an external (Trade) HP customer. |
| 4 | SHIP TO ADDRESS LINE 1 | X40 | Lines 4 through 11 indicate |
| 5 | SHIP TO ADDRESS LINE 2 | X40 | the physical ship to location. |
| 6 | SHIP TO ADDRESS LINE 3 | X40 | This must be printed on the |
| 7 | SHIP TO ADDRESS LINE 4 | X40 | Proforma Invoice and Box |
| 8 | SHIP TO ADDRESS LINE 5 | X40 | Address Label (box label). |
| 9 | SHIP TO CITY | X45 | |
| 10 | SHIP TO STATE | X15 | |
| 11 | SHIP TO ZIP | X18 | |
| 12 | INVOICE ADDRESS LINE 1 | X40 | Lines 12 through 16 indicate |
| 13 | INVOICE ADDRESS LINE 2 | X40 | the "sold to" |
| 14 | INVOICE ADDRESS LINE 3 | X40 | address from the original |
| 15 | INVOICE ADDRESS LINE 4 | X40 | customer order. |
| 16 | INVOICE ADDRESS LINE 5 | X40 | This must be printed on the Proforma Invoice for international shipments. |
| 17 | MARK FOR ADDRESS LINE 1 | X40 | See notes at end of table. |
| 18 | MARK FOR ADDRESS LINE 2 | X40 | " |
| 19 | MARK FOR ADDRESS LINE 3 | X40 | " |
| 20 | MARK FOR ADDRESS LINE 4 | X40 | " |
| 21 | MARK FOR ADDRESS LINE 5 | X40 | " |
| 22 | WORLD/COUNTRY CODE | X3 | Country code of the destination. |
| 23 | EXPORT INDICATOR+ | X1 | "Y" means Export, international shipment. |
| 24 | NEW ONLY FLAG | X1 | Y" means ship only NEW parts, not refurbished parts. |
| 25 | REQUESTED DATE | 9(8) | CCYYMMDD format Date order sent to supplier. |
| 26 | PAYMENT TERMS | X10 | Must be included on Proforma Invoice for international orders. |
| 27 | NO PARTIAL FLAG | X1 | "Y" means order quantity cannot be split into multiple shipments. |
| 28 | RESHIP FLAG+ | X1 | Y = reship (Not in use at this time). |
| 29 | CONSOLIDATION KEY | X40 | Will be provided in the future to assist in consolidating all items for the same ship-to address within the same box. Must be in place for cost effective international shipping. |
| 30 | ORDER SECTION | X12 | HP order number. |
| 31 | ITEM/SUB ITEM | X4 | HP item number. |
| 32 | PART NUMBER | X20 | HP part number. |
| 33 | PRIORITY | 9(2) | 10 = government order 20 = Hotline (must ship same day) >20 = Standard order |
| 34 | INLAND CARRIER+ | X4 | For international shipments. See list of valid carrier codes used by HP. |
| 35 | CARRIER MODE | X2 | See list of valid carrier codes and modes used by HP. |
| 36 | CARRIER CODE | X4 | See list of valid carrier codes and modes used by HP. |

TABLE 1-continued

Order Event
The following table describes the details of the order event.

| No | Interface Element | Size | Special Instructions |
|---|---|---|---|
| 37 | LOGISTIC CHARGES | 9(7)v99 | The charge must be printed on shipping documents. |
| 38 | REQUEST QUANTITY | 9(6) | Quantity to be shipped. |
| 39 | ADJUSTED UNIT PRICE | 9(7)v99 | Unit price must be printed on shipping documents. |
| 40 | CUSTOMER COMMENT | X36 | Must be printed on shipping documents. |
| 41 | CUSTOMER ATTN TO | X36 | Must be printed on shipping documents. |
| 42 | CUSTOMER REFERENCE NUMBER | X36 | Must be printed on shipping documents. |
| 43 | CUSTOMER ACCOUNTING REFERENCE | X36 | Must be printed on shipping documents. |
| 44 | DELIVER TO 1 | X34 | Must be printed on packing list. |
| 45 | DELIVER TO 2 | X34 | Must be printed on packing list. |
| 46 | RETURN PROGRAM | X10 | (Not in use at this time). |
| 47 | CARRIER PROGRAM | X10 | (Not in use at this time). |
| 48 | BUSINESS PROGRAM | X10 | (Not in use at this time). |
| 49 | RMA COMMENT 1* | X50 | Printed on the RMA form. |
| 50 | RMA COMMENT 2* | X50 | Printed on the RMA form. |
| 51 | RMA COMMENT 3* | X50 | Printed on the RMA form. |
| 52 | RMA COMMENT 4* | X50 | Printed on the RMA form. |
| 53 | RMA COMMENT 5* | X50 | Printed on the RMA form. |
| 54 | RMA COMMENT 6* | X50 | Printed on the RMA form. |
| 55 | RMA COMMENT 7* | X50 | Printed on the RMA form. |
| 56 | RMA COMMENT 8* | X50 | Printed on the RMA form. |
| 57 | RMA COMMENT 9* | X50 | Printed on the RMA form. |
| 58 | RMA COMMENT 10* | X50 | Printed on the RMA form. |
| 59 | RMA COMMENT 11* | X50 | Printed on the RMA form. |
| 60 | RMA COMMENT 12* | X50 | Printed on the RMA form. |
| 61 | RMA COMMENT 13* | X50 | Printed on the RMA form. |
| 62 | RMA COMMENT 14* | X50 | Printed on the RMA form. |
| 63 | RMA COMMENT 15* | X50 | Printed on the RMA form. |
| 64 | RMA PRINT INSTRUCTIONS* | X4 | "EACH" or "LINE" (see notes at end of table). |
| 65 | SHIP REQUEST ID | X8 | Unique identifier for this transaction. Must be used in the Shipment Confirmation. |
| 66 | RETURN ADDRESS 1* | X30 | Printed on the RMA form. |
| 67 | RETURN ADDRESS 2* | X30 | Printed on the RMA form. |
| 68 | RETURN ADDRESS 3* | X30 | Printed on the RMA form. |
| 69 | RETURN ADDRESS 4* | X30 | Printed on the RMA form. |
| 70 | PART DESCRIPTION | X30 | Must be included on all shipping documents as it appears in this field. |
| 71 | RESTRICTED ARTICLE | X1 | "Y" = restricted article (Hazardous Material) "N" = not restricted |
| 72 | AIRPORT CODE+ | X3 | For international shipments. Printed on the box address label. |
| 73 | RETURN DAYS* | 9(3) | Printed on the RMA form. |
| 74 | INVOICE KEY | X30 | Will be provided in the future to assist in consolidating orders together on one international invoice. (Will be based on the office code, first 4 digits of order number). |
| 75 | RMA_RETURN_REASON_1 | X(30) | (Not in use at this time). |
| 76 | RMA_RETURN_REASON_2 | X(30) | " |
| 77 | RMA_RETURN_REASON_3 | X(30) | " |
| 78 | RMA_RETURN_REASON_4 | X(30) | " |
| 79 | RMA_RETURN_REASON_5 | X(30) | " |
| 80 | RMA_RETURN_REASON_6 | X(30) | " |
| 81 | RMA_RETURN_REASON_7 | X(30) | " |
| 82 | RMA_RETURN_REASON_8 | X(30) | " |
| 83 | RMA_RETURN_REASON_9 | X(30) | " |
| 84 | RMA_RETURN_REASON_10 | X(30) | " |
| 85 | RMA_RETURN_REASON_11 | X(30) | " |
| 86 | RMA_RETURN_REASON_12 | X(30) | " |
| 87 | RMA_RETURN_REASON_13 | X(30) | " |
| 88 | RMA_RETURN_REASON_14 | X(30) | " |
| 89 | RMA_RETURN_REASON_15 | X(30) | " |
| 90 | SCHEDULE_B_NUMBER | X(10) | "Harmonized tariff code". Required for international shipments; must be printed printed on the Proforma Invoice. |
| 91 | PURCHASE_ORDER_NUMBER | X(10) | Must be cross-referenced to the HP order number and item number, and sent back in the Shipment Confirmation for this order request. |

+Denotes fields required on int'l shipping documents.
*Denotes return material authorization (RMA) printing information.

TABLE 2

Confirmation Event
The following table describes the details of the confirmation event.

| No. | Data Element | Size | Notes |
|---|---|---|---|
| 1 | TRANSACTION | X6 | Literal = "SHPCNF" |
| 2 | DISTRIBUTION CENTER | X8 | VS Supplier's vendor code. Must be accurate! |
| 3 | ORDER-SECTION | X12 | From the original Create Shipment Order. |
| 4 | ITEM/SUB-ITEM | X4 | From the original Create Shipment Order. |
| 5 | PART NUMBER | X16 | From the original Create Shipment Order. |
| 6 | SHIP QUANTITY | Int | ASCII format. Right justify, format with leading zeroes. |
| 7 | SHIP DATE | 9(8) | CCYYMMDD format with numbers only, no special characters. |
| 8 | BILL OF LADING | X12 | From VS Supplier, for all shipments. For international shipments only, use the "House Airway Bill." |
| 9 | SHIP BOX NUMBER | 9(5) | Unique ID for each box as provided by VS supplier's shipping system. |
| 10 | WEIGHT | 9(4).99 | From VS supplier. Must be in kilograms. |
| 11 | CARRIER CODE | X4 | From VS supplier (use standard carrier codes defined in the table of Valid Carrier Codes). |
| 12 | CARRIER MODE | X2 | From VS supplier (use standard carrier codes defined in the table of Valid Carrier Codes). |
| 13 | INVOICE NUMBER | X10 | From VS supplier (only required for international orders; from the proforma invoice for customs). |
| 14 | COUNTRY ORIGIN | X3 | From VS supplier (standard world country code for the country of manufacture of this part-000 for USA). |
| 15 | SHIP REQUEST ID | 9(8) | From the original Create Shipment Order. This ID is used to identify |

TABLE 2-continued

Confirmation Event
The following table describes the details of the confirmation event.

| No. | Data Element | Size | Notes |
|---|---|---|---|
| | | | this particular transaction to GSL systems. Must be included in all transactions related to the "order-num-item" for this shipment. |
| 16 | TRACKING NUMBER | X18 | Not used. |
| 17 | UNIT OF MEASURE | X2 | Unit of measure used by the VS supplier to sell this part (ea = each, bx = box, etc.) GSL Procurement system needs this to report any discrepancy between the actual unit of measure and that on the open purchase order. |
| 18 | PURCHASE ORDER NUMBER | X10 | VS PO number for this part as communicated from the buyer to the VS supplier. Must be accurate! |
| 19 | PO LINE ITEM | 9(4) | VS PO number line item for this part number; literal value is always "0001". |
| 20 | SPECIAL PROGRAM | X8 | Populate with "VS" for Virtual Sourcing. |
| 21 | EXPORT PORT | X4 | The last United States port where the goods reside (the carrier will define the port in cases where the plane's flight has multiple stops). Valid Port Codes are listed in Chapter 5. |
| 22 | TRANSIT DAYS | 9(4) | Number of days from your location to the scheduled date of departure from the port of export (where the plane takes off). |
| 23 | AIR CARRIER CODE | 9(4) | Code assigned to air carrier for export shipments. HP will provide list of valid codes. |
| 24 | EXPORT INDICATOR | X1 | "Y" if it is an int'l shipment, "N" if not int'l. |

TABLE 3

Reaction Event
The following table describes the details of the rejection event.

| No. | Data Field | Size | Notes |
|---|---|---|---|
| 1 | TRANSACTION | X6 | Literal "SHPREJ" |
| 2 | DISTRIBUTION CENTER | X8 | VS Supplier's vendor code. |
| 3 | ORDER SECTION | X12 | From the original Create Shipment Order transaction. |
| 4 | ITEM/SUB ITEM | X4 | From the original Create Shipment Order transaction. |
| 5 | PART NUMBER | X16 | From the original Create Shipment Order transaction. |
| 6 | QUANTITY | Int | The quantity the VS supplier cannot fulfill on this order, given in ASCII format. |
| 7 | ADJUSTMENT DATE | 9(8) | CCYYMMDD (today's date). |
| 8 | SHIP REQUEST ID | 9(8) | From the original Create Shipment Order transaction. |
| 9 | REASON REJECT | X10 | Reason for Shipment Rejection (HP to provide list of valid values). |

TABLE 4

Inventory-Synchronization Event
The following table describes the details of the Inventory Synchronization event.

| No. | Data Element | Size | Notes |
|---|---|---|---|
| 1 | TRANSACTION | X6 | "INVDMP" - Inventory Transaction |
| 2 | DISTRIBUTION CENTER | X8 | VS supplier's vendor code. |
| 3 | PART NUMBER (KEY) | X16 | From VS supplier. |
| 4 | AVAILABLE QUANTITY | Int | ASCII format |
| 5 | DATE | 9(8) | CCYYMMDD format |
| 6 | TIME | 9(6) | HHMMSS format (24 hour clock) |

What is claimed is:

1. A method for processing a customer generated order for a product, wherein the customer order is received by at least one client operably connected through at least one server to a plurality of suppliers via a network, the method characterized by the steps of:

the client creating an order event with a preferred supplier;

the client determining the preferred supplier according to geographical location and inventory availability of the suppliers;

the client validating the information from the customer generated order; and, the client assigning a purchase order number for said order event;

the server routing said order event to the preferred supplier;

the server monitoring status of said order event from the preferred supplier;

the preferred supplier processing said order event; and, the server periodically synchronizing inventory between the client and the plurality of suppliers independently of the foregoing steps;

wherein the step of creating an order event with a preferred supplier further comprises the steps of:

determining said first preferred supplier having an inventory of available product that is favorably geographically located to minimize the time and expense of shipment of the product to the customer; and, determining a second preferred supplier having an inventory of available product in the event that the inventory of available product of said first preferred supplier is not sufficient to fill the customer order.

2. The method according to claim 1 wherein said step of the preferred supplier processing said order event further comprises the steps of:

the preferred supplier shipping the product to the customer; and the preferred supplier creating a confirmation event.

3. The method according to claim 1 wherein said step of the server synchronizing inventory between the client that routed the order event and the preferred supplier further comprises the steps of:

the server retrieving the most updated inventory from the preferred supplier;

the server sending an inventory-synchronization event with the updated inventory to the client;

the client updating the current inventory for the preferred supplier; and, the server starting a timeout to initiate the server.

4. A method as defined in claim 3 wherein the server is initiated at the expiration of said timeout.

5. A method as defined in claim 1 wherein the network is the Internet.

6. A method for processing a customer generated order for a product, wherein the customer order is received by at least one client operably connected through at least one server to a plurality of suppliers via a network, the method characterized by the steps of:

the client creating an order event with a preferred supplier;
the client determining the preferred supplier according to geographical location and inventory availability of the suppliers;
the client validating the information from the customer generated order; and,
the client assigning a purchase order number for said order event;
the server routing said order event to the preferred supplier;
the server monitoring status of said order event from the preferred supplier;
the preferred supplier processing said order event; and,
the server periodically synchronizing inventory between the client and the plurality of suppliers independently of the foregoing steps;
wherein said step of the server routing said order event to said preferred supplier further comprises the steps of:
the server monitoring the client for an order event;
the server obtaining said order event;
the server validating the order event prior to identifying the preferred supplier of the product;
the server then determining the existence and identification of the preferred supplier of the product;
the server then sending the order event to the existing and identified preferred supplier when the preferred supplier exists; and,
the server sending a rejection event to the client that generated the purchase order when no existing supplier is identified.

7. The method according to claim 6, wherein said step of the server then sending the order event to the existing and identified preferred supplier further comprises the steps of:

the preferred supplier assigning a tracking number for the order event if the preferred supplier accepts the order event; and,
the server sending a rejection event back to the client if the preferred supplier does not accept the order event.

8. The method according to claim 7 wherein said step of the preferred supplier assigning a tracking number for the order event further comprises the steps of the server saving the order event with the tracking number as an open status.

9. A method for processing a customer generated order for a product, wherein the customer order is received by at least one client operably connected through at least one server to a plurality of suppliers via a network, the method characterized by the steps of:

the client creating an order event with a preferred supplier;
the client determining the preferred supplier according to geographical location and inventory availability of the suppliers;
the client validating the information from the customer generated order; and,
the client assigning a purchase order number for said order event;
the server routing said order event to the preferred supplier;
the server monitoring status of said order event from the preferred supplier;
the preferred supplier processing said order event; and,
the server periodically synchronizing inventory between the client and the plurality of suppliers independently of the foregoing steps;
wherein said step of the server monitoring status of said order event from the preferred supplier further comprises the steps of:
the server composing a list of order events with open status;
the server determining the preferred supplier for each order event with open status;
the server requesting a status message for each order event with open status from the preferred supplier;
the preferred supplier sending a status message with the most current status for the order event to the server;
the server starting a timeout if the order event is open;
the server sending a confirmation event to the client if the order event is closed; and
the server sending a rejection event to the client if the order event is rejected.

10. The method according to claim 9 wherein said step of the server sending a confirmation event to the client further comprises the steps of:

the server changing the order event from an open to a closed status;
the server starting a timeout; and,
the client sending an invoice to the customer for shipment.

11. The method as defined in claim 10 wherein said timeout is configurable for each supplier and is preferably of sufficiently short duration to ensure reliable communications relating to the operation of the processing method are maintained.

12. The method according to claim 9 wherein said step of the server sending a rejection event to the client further comprises the steps of:

the server changing the order event from an open to a rejected status; and,
the server starting a timeout.

13. A method for processing a customer generated order for purchasing a quantity of at least one of a plurality of products and specifying a delivery location for the purchased quantity, wherein the customer order is received by at least one client operably connected through at least one server to a plurality of suppliers located throughout a large geographical area via a network such as the Internet, the method comprising the steps of:

the client creating an order event with a first supplier, said first supplier being determined as a-function of having an available inventory of the purchased one product and the location of the first supplier being proximate the delivery location specified by the customer so as to minimize at least one of the time and cost of delivery of the product;
the server routing said order event to the first supplier for processing by the first supplier;
the server periodically communicating with the first supplier to monitor the status of said order event being processed by the first supplier;
the first supplier processing said order event by doing one of accepting and rejecting the order event; and, the server periodically synchronizing inventory between the client and the plurality of suppliers independently of the foregoing steps.

14. A method as defined in claim 13 wherein the large geographical area comprises any portion of the world that is accessible by the Internet.

15. A method as defined in claim 13 further comprises the client creating an order event with a second supplier in the event said first supplier has an insufficient inventory of the purchased one product, said second supplier being determined as a function of the location of the second supplier being proximate the delivery location specified by the customer so as to minimize at least one of the time and cost of delivery of the product.

16. A method as defined in claim 13 wherein the periodic communication with the first supplier is configurable and preferably occurs at sufficiently short intervals to ensure that adequate information relating to the reliable operation of the processing method is provided.

17. A method as defined in claim 13 wherein the step of the first supplier processing said order event further comprises:
   the first supplier assigning a tracking number for the order event; and,
   the server saving the order event with the tracking number as an open status.

18. A method as defined in claim 13 wherein the step of the first supplier processing said order event and rejecting the same further comprises:
   the server changing the order event from an open to a rejected status; and,
   the server starting a timeout.

19. A method as defined in claim 13 wherein the step of synchronizing inventory comprises updating the available inventory of the first supplier after reducing the amount of the available inventory by the amount of product purchased by the customer.

20. A system for fulfilling a customer generated order by at least one client, wherein the customer order is received by at least one client operably connected through at least one server to a plurality of suppliers via a network, said system comprising:
   means for creating an order event with a first preferred supplier having an inventory of available product that is favorably geographically located to minimize the time and expense of shipment of the product to the customer, and determining a second preferred supplier having an inventory of available product in the event that the inventory of available product of said first preferred supplier is not sufficient to fill the customer order;
   means for routing said order event to each said preferred supplier;
   means for monitoring status of said order event from each said preferred supplier;
   means for processing said order event; and,
   means for periodically synchronizing inventory between the client and the plurality of suppliers.

21. A system as defined in claim 20 further comprising the supplier shipping the product ordered by the customer immediately after the order event has been processed.

22. A system for fulfilling a customer generated order by at least one client, wherein the customer order is received by at least one client operably connected through at least one server to a plurality of suppliers via a network, said system comprising:
   the client creating an order event with at least one preferred supplier responsive to an order being received from the customer;
   the client determining the preferred supplier according to geographical location and inventory availability of the suppliers:
   the client validating the information from the customer generated order;
   the client assigning a purchase order number for said order event;
   the server routing said order event to the preferred supplier;
   the server monitoring status of said order event from the preferred supplier;
   the preferred supplier processing said order event; and,
   the server synchronizing inventory between the client and the plurality of suppliers.

23. A system as defined in claim 22 wherein the client creates an order event with said first preferred supplier having an inventory of available product that is favorably geographically located to minimize the time and expense of shipment of the product to the customer, and determines a second preferred supplier having an inventory of available product in the event that the inventory of available product of said first preferred supplier is not sufficient to fill the customer order.

* * * * *